May 31, 1955  E. A. STECKEL ET AL  2,709,475
FABRIC TREATING METHOD AND APPARATUS
Filed Feb. 10, 1954  2 Sheets-Sheet 2
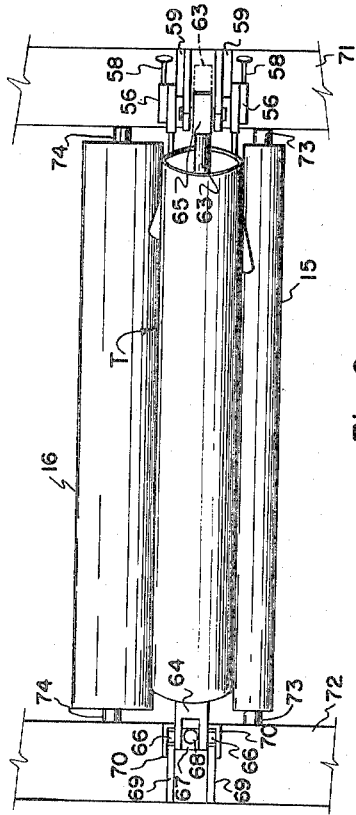
Fig. 6
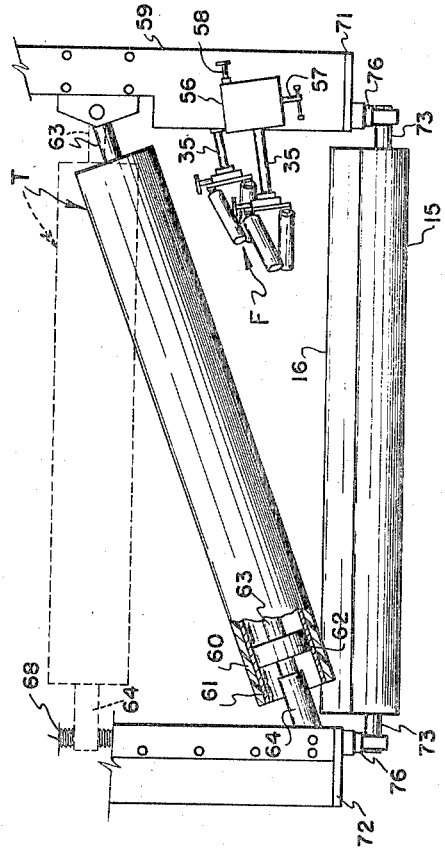
Fig. 5
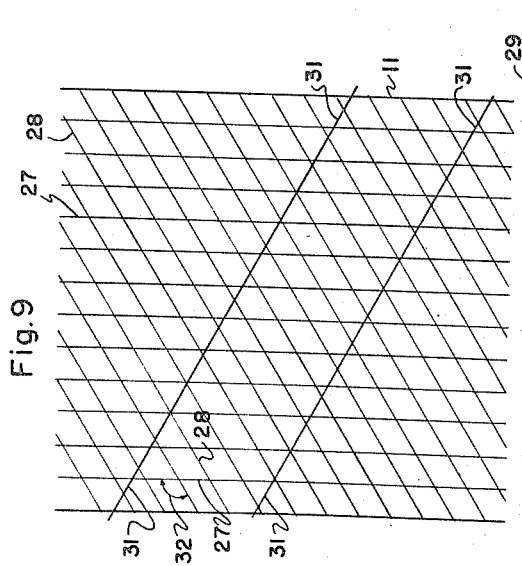
Fig. 9
Fig. 8
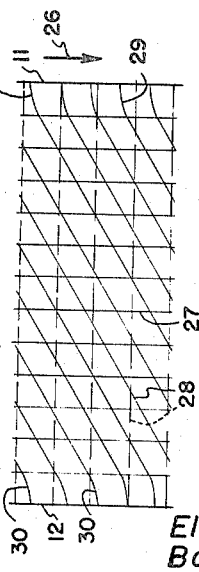
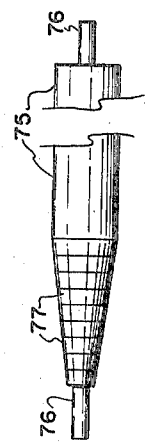
Fig. 7
INVENTORS
Elmer A. Steckel
Bart Pasqua
BY
Horace B. Van Valkenburgh
ATTORNEY

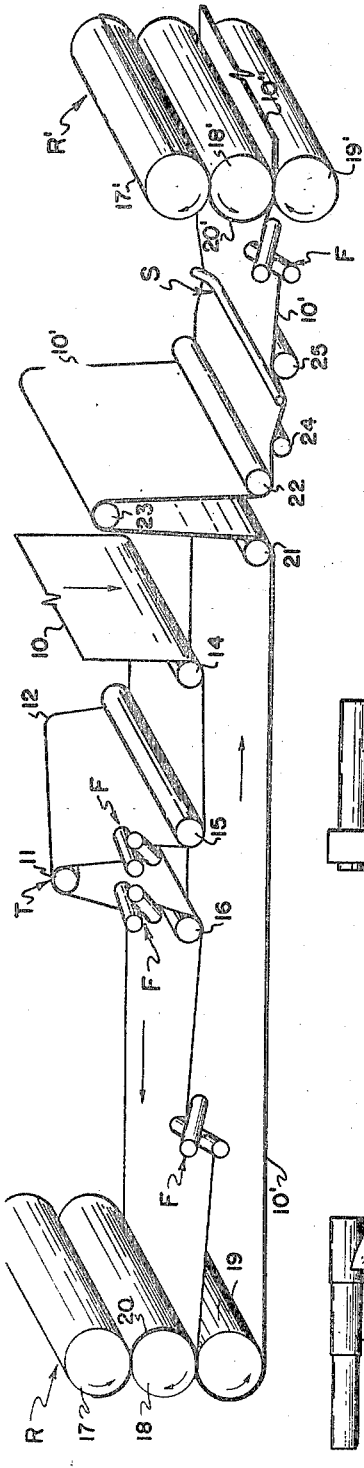
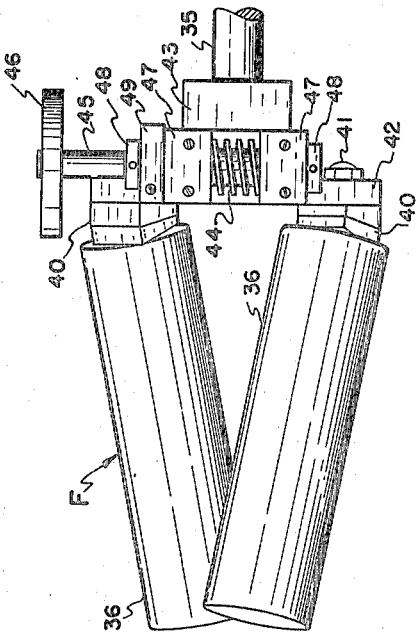
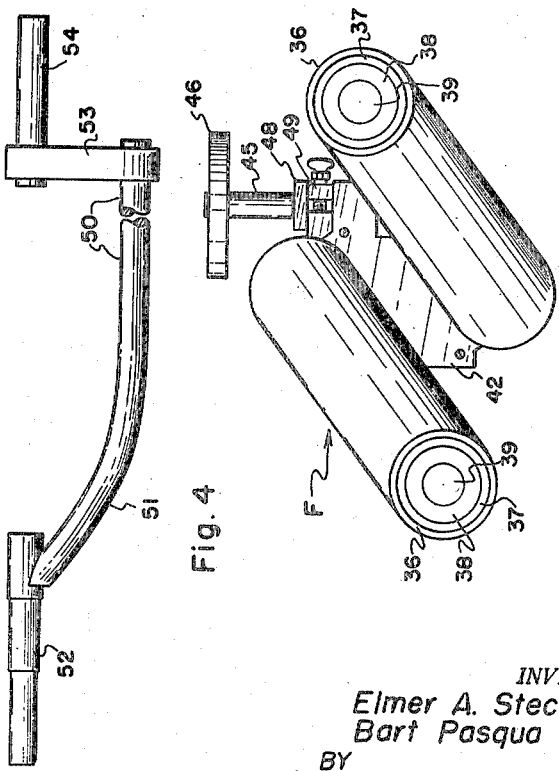

United States Patent Office 2,709,475
Patented May 31, 1955

2,709,475

FABRIC TREATING METHOD AND APPARATUS

Elmer A. Steckel, Wheatridge, and Bart Pasqua, Englewood, Colo., assignors to The Gates Rubber Company, Denver, Colo., a corporation of Colorado Application February 10, 1954, Serial No. 409,344

19 Claims. (Cl. 154—1)

This invention relates to a method of and apparatus for treating fabric to produce a desired angular relationship between the fill and warp threads thereof, thereby producing a so-called bias fabric, and more particularly to such a method and apparatus utilized in conjunction with the application of layers of rubber to one or both sides of the fabric to produce a calendered fabric. The term "rubber," as used herein, refers primarily to natural and synthetic rubbers, but also refers to any other compound or composition which has the elastic and other properties of rubber which fit it for use in the production of a calendered fabric.

Fabric which is covered or coated with a layer of rubber, usually on both sides, is particularly adapted to be cut into strips for use in making belts and similar products. The flexibility of certain products is increased by use of bias fabric. For example, in a V-belt having a square woven fabric cover, the warp threads of the fabric run longitudinally around the belt. When the belt is bent around a pulley, the warp threads on the inner surface are put in compression, while the warp threads on the outer surface are put in direct tension, both effects tending to resist bending. Consequently, all belts are constructed with bias covers. When bias fabric is used as the belt cover, neither warp or fill threads are either perpendicular or parallel to the longitudinal axis of the belt. In bending, the threads are not placed in direct tension or compression. Further, as the belt bends, the angle between warp and weft threads will change according to the amount of bending. On the top of the belt both sets of threads tend to align themselves with the longitudinal axis of the belt to accommodate the increased belt length. On the other hand, both sets of threads on the inner face of the belt tend to align themselves transversely to the belt to accommodate the decreased belt length. A high degree of flexibility is thereby achieved. In effect, when bias fabric is placed in tension or compression, the warp and fill threads will accommodate the resulting increase or decrease in length by increasing or decreasing the angle between the two sets of threads.

A bias fabric is conventionally produced by weaving a flat strip of fabric with the fill threads extending at 90° to the warp or longitudinal threads, and then cutting across the width of the fabric, as at an angle of 45°, so that the resultant strip will have threads disposed at 90° to each other, but at 45° to the sides of the strip. This produces a forward included angle, i. e., the angle between the warp and fill threads in the longitudinal direction of the strip, of 90°. However, it has been found that a forward included angle of the fabric strips in excess of 90°, that is, between 95° and 150°, as disclosed and claimed in U. S. Patent No. 2,519,590 of L. W. Mitchell, entitled "Power Transmission Belt Cover" and granted August 22, 1950, provides superior qualities, such as greater flexibility, longer life, and the like, to a belt made therefrom. To permit a forward included angle of greater than 90° to be obtained, the fabric has been woven in the form of a tube, with the warp threads running lengthwise of the tube, and the fill threads running around the tube at right angles to the warp threads. The tube is then spirally cut in such a manner that both warp and fill threads form an angle of 45° with the cut edge. During tensioning, while processing of the fabric is taking place, the fabric tends to stretch, thus increasing the lateral angle between crossing threads, i. e., in the direction toward the side of the fabric. After such fabric has been calendered, i. e., a layer of rubber or the like placed on one or usually both sides, individual strips may be produced by cutting at right angles across the width of the fabric, the forward included angle thereby having a value greater than 90°. However, each of these individual strips is square at each end, and a triangular piece at each end is cut away, so that the overlap of adjacent ends of successive strips will extend at an angle to the sides, rather than across the width of the belt or other part which is being built up, which increases the labor cost and produces waste through the discard of these triangular pieces. In addition, a tubular woven fabric is more expensive to produce than a flat strip, and lower calender speed is required than if one set of threads extended longitudinally of the strip to which rubber is being applied.

A bias fabric, in which the fill threads extend at an angle to the warp threads, has been produced by special looms, but these looms have not proved to be satisfactory in operation, and the final cost of the product is thus considerably greater than with the tubular woven fabric described above.

Among the objects of this invention are to provide a novel method for treating an elongated strip of fabric having longitudinally extending warp threads and transversely extending fill threads, to produce a bias fabric in which the fill threads extend angularly to the warp threads; to provide such a method by which the angular relationship between the fill and warp threads may be controlled; to provide such a method by which the fill threads may be moved relatively to the warp threads to a desired angle, and the fill threads will remain in parallel position and also each fill thread will form a straight line; to provide such a method which is particularly adapted to be utilized in conjunction with the calendering of fabric, in which a layer of rubber is applied to opposite sides of the fabric; to provide such a method which permits faster calender speeds to be employed; to provide such a method which produces a calendered fabric which may cut to produce bias calendered strips which involve a minimum of waste and labor costs; to provide apparatus which is particularly adapted to carry out the above method; to provide such apparatus which is adapted to be installed without undue difficulty in connection with apparatus for making calendered fabric; to provide such apparatus which may exist in one or more different forms; and to provide such apparatus which is efficient and effective in operation.

Additional objects and the novel features of this invention will become apparent from the following following description, taken in connection with the accompanying drawings, in which:

Fig. 1 is a diagrammatic, perspective view of apparatus constructed in accordance with this invention, installed in a calendering machine;

Fig. 2 is a side elevation, on an enlarged scale, of a set of finger rolls, forming part of the apparatus of Fig. 1;

Fig. 3 is an end elevation of the finger roll set of Fig. 2;

Fig. 4 is a condensed front elevation, on an enlarged scale, of a thread straightening device forming part of the apparatus of Fig. 1;

Fig. 5 is a front elevation of a tilted roll assembly, forming part of the apparatus of Fig. 1;

Fig. 6 is a top plan view of the tilted roll assembly of Fig. 5;

Fig. 7 is a condensed front elevation of a straightening device alternative to that of Fig. 4;

Fig. 8 is a diagram of a portion of a fabric strip, illustrating the relative position of the warp and fill threads at various times during processing; and Fig. 9 is a diagram of a portion of the final fabric strip, illustrating the manner in which the same may be utilized in cutting strips for use in building up belts and the like.

Apparatus constructed in accordance with this invention, and which is particularly adapted to carry out the method of this invention, preferably includes a series of rolls or the like for maintaining tension on a fabric strip 10 of Fig. 1, during its passage over a tilted roll T, which produces a shift in the angular relationship between the warp and fill threads, by causing the fabric to travel along a path which is longer for one edge than the opposite edge, and for parts of the fabric intermediate the edges along paths which are shorter in proportion to the distance from the edge having the longer path. The fabric strip 10 is woven flat, with the fill threads at 90° to the warp or longitudinal threads, thereby permitting the least expensive fabric to be utilized. The warp and fill threads may be yarn, cord, or the like, of any desired material, and a weave is preferably employed which is looser than that normally utilized in the production of fabric previously employed.

As will be evident, the edge 11 travels along a longer path and thus may be termed the "tight" edge of the fabric, while the opposite edge 12 may be termed the "loose" edge. For reasons explained later, the part of the fill threads at and adjacent the tight edge 11 and also at and adjacent the loose edge 12, are not shifted the same amount as the remainder of each of the fill threads, so that it is necessary to straighten the threads at and adjacent the edges 11 and 12 of the strip. For the tight edge 11, this may be accomplished by one or more sets of finger rolls F, which cause the part of the fabric at and adjacent the tight edge to travel a longer path at each finger roll, such path being longest for the tight edge and shorter for the remainder of this part of the fabric, in proportion to the distance from the edge, i. e., as the distance from the tight edge increases. Four sets of finger rolls F may be utilized, such as one immediately before and one immediately after the tilted roll T, one immediately before a first roll stand R, and one immediately before a second roll stand R'. To correct the inclination of the fill threads at and adjacent the loose edge 12, a straightening device S may be utilized, which forces the loose edge and the laterally adjacent part of the fabric to follow a shorter path than the remainder of the fabric, with the loose edge following the shortest path and the remainder of this adjacent part following successively longer paths, as the lateral distance from the loose edge increases.

As indicated previously, the fabric is maintained under tension during the passage over the tilted roll T, and also between the finger rolls F and over the straightening device S. Thus, the fabric 10 may be unrolled from a supply roll (not shown) and maintained under suitable tension, as by a braking device which resists unrolling. The fabric 10 may pass under a guide roll 14 and then under a roll 15 below the tilted roll T and then under a roll 16, whose axis is preferably parallel to that of roll 15, the rolls 15 and 16 forming a pair of spaced tension rolls between which the tilted roll T is mounted. It will be understood, of course, that the position of the tilted roll T may be forwardly or rearwardly from that shown, so that the tilted roll T is still between the rolls 15 and 16, with respect to the movement of the fabric 10, but may actually be forwardly or rearwardly of a vertical line through the axis of roll 15 or roll 16. Or, the rolls 15 and 16 may be placed one above the other, in which case tilted roll T will be placed forwardly or rearwardly of the rolls 15 and 16. A set of finger rolls F is also conveniently disposed at the tight side 11 of the fabric 10, between tilted roll T and the rolls 15 and 16, respectively. Another set of finger rolls F may also be disposed at the tight side 11 of the fabric, between the roll 16 and the first roll stand R. The latter may include an upper, or nip roll 17, a center roll 18 and a lower roll 19, each rotating in the direction of the arrow thereon and the rubber or other material with which one side of the fabric 10 is to be coated being supplied between the rolls 17 and 18 on the entrance side, the thickness of the layer 20 to be adhered to the strip 10 being determined by the nip or distance between the rolls 17 and 18. Thus, the layer 20 of rubber or the like is guided around by roll 18 to the strip 10, and pressed into or on the fabric between the rolls 18 and 19. The fabric strip 10', having a layer of rubber on one side, thus passes around roll 19 and then moves to a set of guide rolls 21 and 22, between which may be placed a take-up roll 23, and thence to a second pair of tension rolls 24 and 25, between which the straightening device S may be disposed. A fourth set of finger rolls F at the tight edge 11 may be disposed between roll 25 and the second roll stand R', the latter of which may include a nip roll 17', a central roll 18', and a lower roll 19', the rubber or other material which is to be applied to the opposite side of the single coated strip 10' being fed between rolls 17' and 18' and a layer 20' of rubber being carried around the opposite side of roll 18' to be applied to the fabric 10' between rolls 18' and 19' and produce the final strip 10'' having a layer of rubber on each side of the fabric.

In addition to the parts shown, suitable feed devices for supplying rubber to the roll stands R and R', adjustment and control apparatus for maintaining the thickness and uniformity of the layers 20 and 20', and shifting devices for maintaining the strip in alignment at each of the parts, and other auxiliary apparatus and appurtenances, may be utilized. Preferably included among these is an electric eye or similar device for maintaining the tight edge 11 of the strip 10 at a predetermined position on the tilted roll T, such as by control of lateral movement of the guide roll 14, or of roll 15. It will be understood, of course, that the finger roll sets F and the straightening device S may be placed at any suitable position along the path of travel of the fabric strip, and that more or less than four finger roll sets F may be used. However, the movement and positions of the finger rolls F shown have worked out quite well in practice, and it appears that the placement of the first layer 20 tends to hold the fill threads at the tight edge 11 in straightened position, after passage through three sets of finger rolls F, while the fourth set of finer rolls F, just prior to the second roll stand R', insure that the fill threads at the tight edge will be straight just prior to the application of the second layer 20'. After tension on the strip is removed, except for the rubber layers 20 and 20', there might be a tendency for reshifting.

The fabric 10 is preferably woven more loosely than the weave which might otherwise be utilized, as indicated previously, to permit the angular shift in the threads. During shifting, the fill threads move closer together, and as the fill threads approach each other, there is greater resistance to further movement until an angle is reached at which further movement is resisted, so that there is what may be termed a locking angle for each weave. Thus, the weave should be sufficiently loose that the locking angle for the weave is greater than the angularity to be produced.

The tilting roll T is preferably rubber covered, so that the fabric will be tightly gripped under tension. However, due to the fact that at both the tight edge 11 and the loose edge 12, there is no fabric respectively above or below, which may be gripped, the relative movement of the threads is less at and adjacent the tight and loose edges. As shown in Fig. 8, there is actually a longitudinal displacement of each warp thread 27, with respect to the next warp thread, from one side of the fabric to the other, and this displacement of each warp thread 27 is followed by the fill threads 28. Thus, the fill threads 28 are initially in the transverse or dotted position of Fig. 8, and are moved to the full position of Fig. 8 by passage over the tilted roll T. However, at both the portion 29 at tight edge 11 and the portion 30 at the loose edge 12, the fill threads do not follow a straight line, but rather curve toward their previous position relative to the warp threads 27, as shown. It will be understood that, in Fig. 8, no attempt has been made to show all of the warp threads or fill threads, since the fabric strip 10 may be several feet wide and contain thousands of threads and that therefore over the curved portions 29 and 30 there will be numerous warp threads 27. For a fabric strip 60" wide, for instance, the curvature at the loose and tight edges may extend over a distance of around 6" on the tight side, and 10" to 12" on the loose side.

When the curved portions 29 and 30 of the fill threads are straightened by the finger rolls F and the straightening device S, the fill threads 28 will extend in parallel relationship and at an angle to the warp threads 27, as in Fig. 9. Thus, when a strip for making belts or the like is cut from the coated fabric strip, such as along parallel lines 31, the forward included angle 32, between threads 27 and 28 in the longitudinal direction of the cut strip, will be greater than 90°. As shown, the angle 32 is approximately 120°, although it will be understood that the angle 32 may be varied, such as between 95° and 150°. The cutting lines 31 are preferably parallel to a bisector of angle 32, so that the threads 27 and 28 will be disposed at the same angle to the cutting lines 31. Thus, when the forward included angle 32 at 120°, the cutting lines 31 will extend at 60° to the edges of the main strip, and for correspondingly different angles when angle 32 is different.

Each of the finger roll sets F may be constructed in the manner illustrated in Figs. 2 and 3, such as being mounted on a supporting rod 35 which may be attached in fixed position to a standard or other support, and each of the finger rolls may have an annular cover 36, as in Fig. 3, formed of rubber such as truck tire thread stock, covering a metal cylinder 37 within which a bearing 38 is mounted at each end, the bearings being mounted on a shaft 39. Each shaft 39 is attached to an angular block 40, the opposite faces of which may be disposed at a suitable angle, such as 20½°, i. e., so that the axis of each shaft 39, attached to one face of the block 40, will extend at an angle of 20½° to the axis of a pin 41, which is attached to the opposite face of the block 40. Each pin 41 extends through a plate 42 and is adjustably attached thereto, as by a nut as shown, so that either block 40 may be rotated about the axis of pin 41 and locked in position. Plate 42 is attached to a hub 43 which is rotatable about rod 35 and encloses a worm gear attached to rod 35 and engaged by a worm 44, which in turn is mounted on a shaft 45 which is provided with a handle 46, shaft 45 being journalled in brackets 47 extending from hub 43 and restrained from axial movement by collars 48. Thus, the angular position of the finger roll set F, about the axis of rod 35, may be adjusted by means of handle 46. A clamp 49 may be attached to one bracket 47, so that the finger roll set F may be locked in any desired radial position, with respect to rod 35. Through the angular relation between the axes of each roller shaft 39 and the mounting pin 41, each roll is preferably turned so that the axes of shafts 39 are not parallel to each other, but appear to cross each other, as when viewed from the side, as in Fig. 2, but actually diverge, as is evident when viewed from the end, as in Fig. 3. In addition, the axis of each roll is positioned angularly to the fabric strip, so that the inner end of one roller will engage a point on the fabric 10 which is spaced inwardly from the tight edge 11 at about the point at which the curve 29 of Fig. 8 begins. The other roller of each set F is thereby positioned so that only a portion thereof will engage the fabric, the total effect being to force the tight edge 11 to follow the longest path and the remainder of the adjacent part of the fabric, such as over the curve 29 of Fig. 8, to follow successively shorter paths in accordance with the distance from the tight edge 11. In this way, the curves 29 of the fill threads 28 will tend to be straightened, although again there is a longitudinal displacement of the warp threads 27, with the fill threads 28 following the shift of each warp thread. The curve 29 need not be straightened at one step, but may be straightened in successive steps, for which purpose a plurality of finger roll sets F may be utilized.

The straightening device S, as in Fig. 4, may comprise a rod 50 which is straight over a major portion of its length but has a curved section 51 at one end, which corresponds generally to the curvature of the curved sections 30 of the fill threads 28. Rod 50 is placed between the tension rolls 24 and 25, as indicated previously, with the curved section 51 at the loose side 12. The remainder of the fabric, engaging the straight portion of the rod 50, will be displaced from the center line about which the rod 50 is mounted the same distance throughout. Thus, the remainder of the fabric will follow a longer path than the part at and adjacent the loose edge 12, so that the warp threads 27 over the straight portion of the bar will be displaced, i. e., retarded, and the threads 27 over the part along curve 30 will be displaced in lesser amounts, with the result that the curve 30 will be straightened out and the end of each thread 28 at and adjacent the tight edge 12 will be aligned with the remainder of the thread. Immediately following this straightening of the tight edge, the second rubber coat 20' is applied, so that the threads are retained in straight position.

The curved section 51 of rod 50 may extend to a pin 52, while the opposite end of the rod 50 may be mounted on a bracket 53 which extends perpendicularly to a pin 54, and the pins 52 and 54 have a common axis, so that the straightening device S may be mounted with the pins 52 and 54 in clamps which may be adjusted to permit the device to be placed at any desired position about the axis of pins 52 and 54. Provision also may be made for lateral or side to side adjustment of device S to accommodate any change in fabric width, or any change in the lateral position of the fabric which occurs before the fabric has reached device S. As will be evident, the maximum straightening effect at the loose edge 12 will be obtained when the bracket 54 extends perpendicularly to a line between the centers of rolls 24 and 25, and an angular deviation therefrom, to either side, will decrease the length of the path which the major portion of the fabric is forced to travel by the straight portion of the rod 50.

The supporting rods 35 of the finger roll sets F, as in Fig. 5, may be mounted in clamping brackets 56, each set being adjustable radially about the axis of rod 35, and clamped in a desired position by tightening a clamp handle 57. Each bracket 56 is also adjustable angularly in a direction transverse to the axis of rod 35, as by an adjusting screw 58 which is adapted to rotate the bracket 56 about an axis perpendicular to the axis of rod 35 in any conventional manner. Thus, each bracket 56 may be adjusted in position by screw 58 in a manner similar to the adjustment of plates 42 by shaft 45 and handle 46 of Figs. 2 and 3, i. e., a worm and worm gear may be enclosed by bracket 56. Brackets 56 of the finger roll sets F below tilted roll T, as in Figs. 5 and 6, may be mounted on vertical plates 59, which form a support for one end of roll T, while the remaining finger roll sets F may be mounted on suitable standards or other types of support.

The tilted roll T, as in Figs. 5 and 6, may include a rubber cover 60, such as formed of truck tire tread stock, on a metal cylinder 61 provided with a roller bearing 62 adjacent each end, the inner race of each roller bearing being mounted on a normally stationary shaft 63 which is attached at one end to a yoke 64 and at the opposite end slidably engages a collar 65, as in Fig. 6. Collar 65 is pivotally mounted between plates 59, while yoke 64 is pivotally attached to pins 66 which extend laterally from a nut 67, engaged by a vertical lead screw 68. Each pin 66 may be guided in a slot formed between the edge of a plate 69 and an angle 70. The angle of tilted roll T may be adjusted by turning lead screw 68 in an appropriate direction, the tilted roll T being movable between the tilted or full position of Fig. 5 and the horizontal or dotted position thereof. When the roll T is moved to the horizontal position, the shaft 63 will extend through collar 65, such as to the dotted position indicated in Fig. 6. Supporting plates 59 may be mounted on a base plate 71 at one side of the tilted roll assembly, with plates 69 and angles 70 mounted on a base plate 72 at the other side of the assembly, while a shaft 73 for tension roll 15 and a shaft 74 for tension roll 16 may be mounted in bearing brackets 76, attached to the underside of base plates 71 and 72, or supported in any other suitable manner.

As will be evident, tilted roll T may be placed at any desired angle with respect to the axes of rolls 15 and 16. In general, the angle between the axis of tilted roll T and the plane of the parallel axes of rolls 15 and 16 corresponds to one-half the angle through which the warp of the fill threads 28 are to be shifted, i. e., the acute angle between the dotted and full threads 28 of Fig. 8. In other words, due to the passage of the fabric up to the periphery of tilted roll T and down from the roll T, the threads tend to be shifted through an angle equal to about twice the angle of inclination of the axis of roll T.

In the event that, for some reason, a strip or strips of fabric are to be processed in which the threads are not to be shifted, the tilted roll T may be moved to the dotted horizontal position of Fig. 5, each set of finger rolls F may be removed or shifted to a position in which the rolls no longer engage the strip, and the straightening device S may be removed or may be positioned so that it will not engage the strip. Thus, the calendering apparatus can be used in the same manner as previous to installation of the apparatus of this invention. As will be evident, such changeover requires only a few adjustments and is thus very simple.

In the alternative straightening device illustrated in Fig. 7, a roll 75 is mounted for free rotation on a shaft 76, being positioned between two tension rolls, such as rolls 24 and 25, so as to engage the strip 10' and force the majority of the strip to follow a path portion of predetermined length. However, at the loose edge 12 the roll is provided with a series of frusto-conical segments 77, of increasing diameter inwardly from edge 12 and each of which is separately mounted for rotation about shaft 76. Thus, over the area of segments 77, which corresponds to the width of the curves 30 of the fill threads at loose edge 12, the loose edge 12 will follow a shorter path than the majority of the strip, which engages the straight portion of roll 75, while the part of the strip adjacent edge 12 will follow a path portion which is longer than that at the loose edge, in accordance with the distance therefrom. The segments 77 permit the various longitudinal or warp threads to move at different speeds, in accordance with the diameter at the particular segment involved, thus eliminating a drag on the straight portion of roll 75 and permitting the straight portion to rotate at a peripheral speed corresponding to the speed of the strip. The peripheral outline of segments 77 need not be a straight line, as shown, but may be curved, so as to provide a peripheral outline corresponding to the curved portion 51 of bar 50 of Fig. 4. Also, the shaft 76 for roll 75 may be adjusted upwardly or downwardly, when placed between horizontally disposed tension rolls, such as rolls 24 and 25 of Fig. 1.

From the foregoing, it will be evident that the method and apparatus of this invention fulfill to a marked degree the requirements and objects herein set forth. Higher calender speeds and less expensive fabric can be utilized, while the passage of a square woven fabric strip under tension along a path, a portion of which increases in length from one edge of the strip to the other, produces a shift in the angular relationship between the fill threads and the warp threads over a major portion of the fill threads, i. e., except at the ends. However, by providing local paths, such as through the finger rolls F, the fill threads can be straightened at the tight edge, and by movement of the strip along a path which is the same for a majority of the width of the strip, but is less over a part of the strip adjacent the loose edge with an increase in accordance with the distance from the loose edge, the curve in the fill threads at the loose edge can be straightened. Such a shift in the angular relationship between the fill and warp threads produces two obtuse angles and two acute angles, and by cutting across the fabric along lines which bisect the obtuse angles, individual strips can be cut in which the forward included angle is greater than 90°. In addition, the ends of such individual strips extend at an angle to the sides, so that an angular overlap of successive strips, when building up a rubber belt or the like, is provided. As will be evident, the apparatus of this invention is readily installed in a calendering machine, while the previous normal operation of the calendering machine may be obtained without undue difficulty.

Although a specific embodiment of this invention has been described with particularity, and certain variations therein described, it will be understood that other embodiments may exist and various other changes made, all without departing from the spirit and scope of this invention.

What is claimed is:

1. A method of treating an elongated strip of fabric having longitudinally extending warp threads and transversely extending fill threads to produce fill threads extending angularly to said warp threads, which comprises moving said fabric longitudinally along a path a first portion of which is longer for one edge of said fabric than the opposite edge thereof with such portion of the path for parts of said fabric intermediate said edges being shorter in proportion to the distance from said edge which is passed along said longer path portion, said latter edge thereby being a tight edge and the opposite edge thereby being a loose edge; moving said tight edge and the laterally adjacent part of said fabric, at least at one point along its path, along a second path portion which is longer for said tight edge and shorter for the remainder of said part in proportion to the distance from said tight edge; moving said fabric along a third path portion wherein said loose edge and the laterally adjacent part of said fabric follow a shorter path than the remainder laterally of said fabric, with said loose edge following the shortest path and the remainder of said part following successively longer path portions as the lateral distance from said loose edge increases; and maintaining tension on said fabric during movement along said paths.

2. A method of treating a fabric strip, as defined in claim 1, which includes applying a layer of rubber to at least one side of said fabric strip.

3. A method of treating a fabric strip, as defined in claim 1, wherein said tight edge and the laterally adjacent part of said fabric is moved along a said second path portion at a plurality of points.

4. A method of treating an elongated strip of fabric having longitudinally extending warp threads and transversely extending fill threads to produce a calendered fabric having fill threads extending angularly to said warp threads, as defined in claim 1, which includes applying a layer of rubber to one side of said fabric following passage of said fabric over said first path portion; and applying a layer of rubber to the opposite side of said fabric following said third path portion.

5. A method of treating a fabric strip, as defined in claim 1, wherein said fabric strip is moved along a said second path portion both before and after said first path portion.

6. A method of treating a fabric strip, as defined in claim 5, wherein said strip is moved along a said second path portion following said third path portion.

7. A method of forming bias calendered fabric strips from an elongated strip of fabric having longitudinally extending warp threads and transversely extending fill threads, with said fill threads extending angularly to said warp threads in said calendered strip, which comprises moving said fabric strip longitudinally along a path a first portion of which is longer for one edge of said fabric than the opposite edge thereof with such portion of the path for parts of said fabric intermediate said edges being shorter in proportion to the distance from said edge which is passed along said longer path portion, said latter edge thereby being a tight edge and the opposite edge thereby being a loose edge; moving said tight edge and the laterally adjacent part of said fabric, at least at one point along its path, along a second path portion which is longer for said tight edge and shorter for the remainder of said part in proportion to the distance from said tight edge; applying a layer of rubber to one side of said fabric strip; moving said strip along a third path portion wherein said loose edge and the laterally adjacent part of said strip follow a shorter path than the remainder laterally of said strip, with said loose edge following the shortest path and the remainder of said part following successively longer path portions as the lateral distance from said loose edge increases; applying a layer of rubber to the opposite side of said strip; maintaining tension on said fabric and strip during movement along said paths; and cutting said final strip along parallel lines which extend at an angle substantially bisecting the greater angle between said warp threads and said fill threads.

8. Apparatus for treating an elongated strip of fabric having longitudinally extending warp threads and transversely extending fill threads to produce fill threads extending angularly to said warp threads, which comprises means for moving said fabric longitudinally along a path a first portion of which is longer for one edge of said fabric than the opposite edge thereof with such portion of the path for parts of said fabric intermediate said edges being shorter in proportion to the distance from said edge which is passed along said longer path portion, said latter edge thereby being a tight edge and the opposite edge thereby being a loose edge; means for moving said tight edge and the laterally adjacent part of said fabric, at least at one point along its path, along a second path portion which is longer for said tight edge and shorter for the remainder of said part in proportion to the distance from said tight edge; means for moving said fabric along a third path portion wherein said loose edge and the laterally adjacent part of said fabric follow a shorter path than the remainder laterally of said fabric, with said loose edge following the shortest path and the remainder of said part following successively longer path portions as the lateral distance from said loose edge increases; and means for maintaining tension on said fabric during movement along said paths.

9. Apparatus for treating an elongated strip of fabric having longitudinally extending warp threads and transversely extending fill threads to produce a calendered fabric strip having fill threads extending angularly to said warp threads, which comprises means for moving said fabric longitudinally along a path a first portion of which is longer for one edge of said fabric than the opposite edge thereof with such portion of the path for parts of said fabric intermediate said edges being shorter in proportion to the distance from said edge which is passed along said longer path portion, said latter edge thereby being a tight edge and the opposite edge thereby being a loose edge; means for moving said tight edge and the laterally adjacent part of said fabric, at a plurality of points along its path, along a second path portion which is longer for said tight edge and shorter for the remainder of said part in proportion to the distance from said tight edge; means for applying a layer of rubber to one side of said fabric following said first path portion and at least one said second path portion; means for moving said fabric along a third path portion wherein said loose edge and the laterally adjacent part of said strip follow a shorter path than the remainder laterally of said strip, with said loose edge following the shortest path and the remainder of said part following successively longer path portions as the lateral distance from said loose edge increases; means for maintaining tension on said fabric and strip during movement along said paths; and means for applying a layer of rubber to the opposite side of said strip.

10. Apparatus for treating an elongated strip of fabric having longitudinally extending warp threads and transversely extending fill threads to produce fill threads extending angularly to said warp threads, which comprises a plurality of rolls having parallel axes with the ends of said rolls in longitudinal alignment, said rolls including first and second pairs of spaced rolls; an inclined roll mounted between between said first pair of spaced rolls and in spaced relation to said pair, one end of said inclined roll being spaced at a greater distance than the opposite end thereof from the corresponding ends of said pair of rolls; at least one set of relatively short rolls having angularly disposed axes and engaging the edge and adjacent part of said fabric which passes over the one said end of said inclined roll, at least one of said short rolls being disposed angularly to the direction of principal movement of said fabric at the position of said short rolls so as to force all of said part to travel a greater distance than the remainder of said fabric with said edge traveling the greatest distance and the remaining points of said part a lesser distance than said edge in accordance with the distance from said edge; a fabric engaging member between said second pair of spaced rolls and having a fabric engaging surface generally parallel to said rolls, except over a part at and adjacent the edge of said fabric passed over the opposite end of said inclined roll and which part travels a lesser distance between said rolls of said second pair than the remainder of said fabric across the width thereof, with said edge traveling the least distance and the remainder of said part traveling greater distances as the lateral distance from said edge increases; and means for maintaining tension on said fabric while moving through said rolls.

11. Apparatus for treating a fabric strip, as defined in claim 10, wherein said fabric engaging member comprises a bar which is straight over a major portion of its length and curved at one end over said part.

12. Apparatus for treating a fabric strip, as defined in claim 10, wherein said fabric engaging member comprises a roll having a uniform diameter except at one end which comprises a series of frusto-conical, independently rotatable segments.

13. Apparatus for treating a fabric strip, as defined in claim 10, wherein said inclined roll is adjustable to different angles with respect to the axes of said first pair of spaced rolls and also to a position parallel to said axes.

14. Apparatus for treating a fabric strip, as defined in claim 10, wherein each said set of relatively short rolls is mounted for rotational adjustment as a unit about a first axis extending generally in the direction of the axes of said rolls, and each roll is mounted on a block having non-parallel sides, forming an acute angle therebetween, the axis of rotation of each roll extending perpendicularly to one said side and each block being adjustable independently about an axis perpendicular to the other said side.

15. Apparatus for treating a fabric strip, as defined in claim 14, wherein said blocks are mounted in spaced relation on a plate; said plate is mounted on a hub which is rotatable about a supporting rod; a worm gear is mounted on said supporting rod; a worm and adjusting handle are mounted on said hub with said worm in engagement with said worm gear; a device for locking said worm in position is mounted on said hub; and a bracket is mounted for adjustment about an axis perpendicular to said rod with said rod being clamped in said bracket for longitudinal and radial adjustment.

16. Apparatus for treating a fabric strip, as defined in claim 10, including a pair of spaced base plates; means for supporting said first pair of spaced rolls attached to said base plates; a standard extending upwardly from each base plate; a collar mounted on one standard for pivotal movement about an axis perpendicular to said standard and parallel to said base plate; a lead screw rotatable in either direction and extending upwardly in said opposite standard; a nut engaging said lead screw and having laterally extending pins, said opposite standard being provided with guides for the ends of said nut pins; said inclined roll having a layer of rubber stock on a metal cylinder provided interiorly with a bearing adjacent each end; a shaft extending centrally of said roll and mounted in said bearings, one end of said shaft slidably engaging said collar; and a fork attached to the opposite end of said shaft and pivotally engaging said nut pins, said roll being adjustable to different inclined positions and also to a position parallel to said first pair of spaced rolls through rotation of said lead screw.

17. Apparatus for treating an elongated strip of fabric having longitudinally extending warp threads and transversely extending fill threads to produce a calendered fabric strip having fill threads extending angularly to said warp threads, which comprises a plurality of rolls having parallel axes with the ends of said rolls in longitudinal alignment, said rolls including first and second pairs of spaced rolls; an inclined roll mounted between said first pair of spaced rolls and in spaced relation to said pair of rolls, one end of said inclined roll being spaced at a greater distance than the opposite end thereof from the corresponding ends of said pair of rolls; a plurality of sets of relatively short rolls having angularly disposed axes and engaging the edge and adjacent part of said fabric which passes over the one said end of said inclined roll, at least one of said short rolls being disposed angularly to the direction of principal movement of said fabric at the position of said short rolls so as to force all of said part to travel a greater distance than the remainder of said fabric with said edge traveling the greatest distance and the remaining points of said part a lesser distance than said edge in accordance with the distance from said edge; a fabric engaging member between said second pair of rolls and having a fabric engaging surface generally parallel to said rolls, except over a part at and adjacent the edge of said fabric passed over the opposite end of said inclined roll and which travels a lesser distance between said rolls of said second pair than the remainder of said fabric across the width thereof, with said edge traveling the least distance and the remainder of said part traveling greater distances as the lateral distance from said edge increases; a first set of calender rolls for applying a layer of rubber to one side of said fabric strip; a second set of calender rolls for applying a layer of rubber to the opposite side of said fabric strip; said inclined roll being located to engage said strip prior to said first calender roll set, said fabric engaging member being located to engage said strip after said first calender roll set and prior to said second calender roll set, a first and second set of short rolls being located to engage said strip between said first pair of spaced rolls and respectively before and after said inclined roll, a third set of short rolls being located to engage said strip between said first pair of spaced rolls and said first calender roll set, and a fourth set of short rolls being located to engage said strip between said second set of spaced rolls and said second calender roll set; and means for maintaining tension on said fabric while moving through said rolls.

18. Apparatus for treating an elongated strip of fabric having longitudinally extending warp threads and transversely extending fill threads to produce fill threads extending angularly to said warp threads, which comprises a plurality of rolls having parallel axes with the ends of said rolls in longitudinal alignment, said rolls including a pair of spaced rolls; an inclined roll mounted between said pair of spaced rolls and in spaced relation to said pair of rolls, one end of said inclined roll being spaced at a greater distance than the opposite end thereof from the corresponding ends of said pair of rolls; at least one set of relatively short rolls having angularly disposed axes and engaging the edge and adjacent part of said fabric which passes over the one said end of said inclined roll, at least one of said short rolls being disposed angularly to the direction of principal movement of said fabric at the position of said short rolls so as to force all of said part to travel a greater distance than the remainder of said fabric with said edge traveling the greatest distance and the remaining points of said part a lesser distance than said edge in accordance with the distance from said edge; and means for maintaining tension on said fabric while moving through said rolls.

19. Apparatus for treating an elongated strip of fabric having longitudinally extending warp threads and transversely extending fill threads to produce fill threads extending angularly to said warp threads, which comprises a plurality of rolls having parallel axes with the ends of said rolls in longitudinal alignment, said rolls including first and second pairs of spaced rolls; an inclined roll mounted between said first pair of spaced rolls and in spaced relation to said pair of rolls, one end of said inclined roll being spaced at a greater distance than the opposite end thereof from the corresponding ends of said pair of rolls; a fabric engaging member between said second pair of rolls and having a fabric engaging surface generally parallel to said rolls, except over a part at and adjacent the edge of said fabric passed over the opposite end of said inclined roll and which part travels a lesser distance between said rolls of said second pair than the remainder of said fabric across the width thereof, with said edge traveling the least distance and the remainder of said part traveling greater distances as the lateral distance from said edge increases; and means for maintaining tension on said fabric while moving through said rolls.

References Cited in the file of this patent

UNITED STATES PATENTS

| Re. 14,979 | Lowe | Nov. 9, 1920 |
| 2,343,328 | Robertson | Mar. 7, 1944 |
| 2,421,575 | Nield | June 3, 1947 |
| 2,665,470 | Stapleton | Jan. 12, 1954 |